United States Patent
Italia et al.

(10) Patent No.: US 10,822,257 B2
(45) Date of Patent: Nov. 3, 2020

(54) HVAC FLUID CONDITIONING SYSTEM

(71) Applicant: AC Freeflow, LLC, Fort Lauderdale, FL (US)

(72) Inventors: Richmond Italia, Dorval (CA); Louis Spicer, Sewell, NJ (US)

(73) Assignee: AC Freeflow, Ft. Lauderdale, FL (US)

( * ) Notice: Subject to any disclaimer, the term of this patent is extended or adjusted under 35 U.S.C. 154(b) by 112 days.

(21) Appl. No.: 16/117,895

(22) Filed: Aug. 30, 2018

(65) Prior Publication Data
US 2019/0071331 A1    Mar. 7, 2019

Related U.S. Application Data

(60) Provisional application No. 62/553,253, filed on Sep. 1, 2017.

(51) Int. Cl.
| | |
|---|---|
| C02F 1/50 | (2006.01) |
| C02F 1/68 | (2006.01) |
| C02F 1/76 | (2006.01) |
| F16L 43/00 | (2006.01) |
| F24F 13/00 | (2006.01) |
| F24F 13/22 | (2006.01) |
| F25B 39/04 | (2006.01) |
| F25B 41/00 | (2006.01) |
| C02F 103/02 | (2006.01) |

(52) U.S. Cl.
CPC .............. *C02F 1/50* (2013.01); *C02F 1/688* (2013.01); *F24F 13/00* (2013.01); *F24F 13/222* (2013.01); *F25B 39/04* (2013.01); *F25B 41/003* (2013.01); *C02F 2103/023* (2013.01); *C02F 2303/20* (2013.01); *C02F 2307/14* (2013.01); *F24F 2013/228* (2013.01)

(58) Field of Classification Search
CPC .. C02F 1/50; C02F 1/685; C02F 1/688; C02F 1/76; C02F 2103/023; C02F 2307/14; F16L 43/00; F24F 13/00; F24F 13/222; F24F 2013/228; F25B 39/04; F25B 41/003
See application file for complete search history.

(56) References Cited

U.S. PATENT DOCUMENTS

| | | | | |
|---|---|---|---|---|
| 3,578,776 | A * | 5/1971 | Schneider, Jr. | ......... C02F 1/688 137/268 |
| 5,976,364 | A * | 11/1999 | Williams | ................. C02F 1/50 137/268 |
| 6,550,264 | B1 | 4/2003 | Cantolino | |
| 6,895,771 | B1 | 5/2005 | Cantolino | |

(Continued)

OTHER PUBLICATIONS

European Search Report N414629EP CJO, dated Jan. 24, 2019.

*Primary Examiner* — Lucas A Stelling
(74) *Attorney, Agent, or Firm* — Craig R. Rogers; Simple IP Law, PC

(57) ABSTRACT

According to principles of the present inventive concepts, an HVAC fluid conditioning system comprises an inlet port configured to receive HVAC fluid from an HVAC condensation line. A conditioning system treats the HVAC fluid with a chemical or other treatment process to prevent the growth of harmful pollutants within the HVAC condensation line. The treated HVAC fluid is then released from the conditioning system through an outlet port thereof and back into the HVAC condensation line. A trap system can be provided to trap harmful gases created during the HVAC fluid treatment process.

20 Claims, 9 Drawing Sheets

(56) References Cited

U.S. PATENT DOCUMENTS

2006/0096639 A1    5/2006   Coogle
2006/0191833 A1*   8/2006   Greene, III ............. C02F 1/688
                                                                 210/206
2008/0216503 A1*   9/2008   Cantolino ............... F25D 21/14
                                                                  62/285

* cited by examiner

HVAC FLUID CONDITIONING SYSTEM

PRIORITY CLAIM

Priority Application Benefit Claim

This application is a non-provisional of, and claims priority from, U.S. Provisional Patent App. Ser. No. 62/553,253, filed Sep. 1, 2017, the contents of which are incorporated herein by reference in their entirety.

BACKGROUND OF THE INVENTION

Field of the Invention

This invention relates generally to heating, ventilation, and air conditioning (HVAC) systems, and particularly those using a circulating liquid to control temperature.

SUMMARY OF THE INVENTION

According to one aspect of this invention, a conditioning unit or system is installed in an HVAC unit to dispense an appropriate amount of chlorine or other conditioning chemical into the fluid stream to condition the fluid to prevent growth of harmful pollutants.

More particularly, a chlorine or other chemical dispenser may be installed in an HVAC condensation line. The dispenser may, for instance, dispense a chlorine (or other chemical) tablet, rod, or liquid into contact with the AC condensation water to eliminate algae and/or other harmful pollutants. By eliminating growth of harmful contaminants, the invention can provide a robust, reliable, and cost-effective solution for preventing clogged pipes and water back-ups due to contaminant growth in the HVAC system.

According to one embodiment, a chlorine tablet or rod dispenser can be installed in the AC condensation line of an HVAC system. Tablets or rod(s) may be inserted into a receptacle of the dispenser and can feed into the condensation line. Condensation water running through the condensation line can pass by the tablet or rod and be conditioned with chlorine to kill contaminants and prevent the further growth of algae and/or other harmful contaminants. Possible embodiments of such a system are illustrated in the attached drawings.

It should be noted that this system should preferably be used in conjunction with a P or S trap plumbing system, for example, to keep chlorine or other fumes from entering into the structure being air conditioned. The trap system can, for instance, be installed upstream of the dispenser or be formed as part of the chemical treatment (conditioning) system to provide water to trap the chlorine or other fumes rather than permit them to enter the ambient air. Such a system will preferably prevent the HVAC system from sucking up the chlorine gas and spreading it to the structure being air conditioned.

Numerous other potential embodiments are also contemplated as being within the scope of the present invention and will be readily apparent to those of skill in the art based on the information provided. For instance, other delivery systems are also contemplated and may replace the tablet or rod dispenser. A chlorine or other chemical dripping system, for example, could be used to supply the treatment chemicals to the liquid.

Various further aspects, embodiments, and configurations of this invention are possible without departing from the principles disclosed herein. This invention is therefore not limited to any of the particular aspects, embodiments, or configurations described herein.

BRIEF DESCRIPTION OF DRAWINGS

The foregoing and additional objects, features, and advantages of the present invention will become more readily apparent from the following detailed description of preferred embodiments, made with reference to the accompanying drawings, in which.

DETAILED DESCRIPTION OF ILLUSTRATIVE EMBODIMENTS

Various features, benefits, and configurations incorporating the principles of the present inventive concepts in illustrative embodiments are shown in the accompanying drawings. Additional features, benefits, and configurations will be readily apparent to those of ordinary skill in the art based on this disclosure, and all such features, benefits, and configurations are considered within the scope of the present invention. Various embodiments will now be described in further detail in connection with the accompanying drawings.

Figure 1:
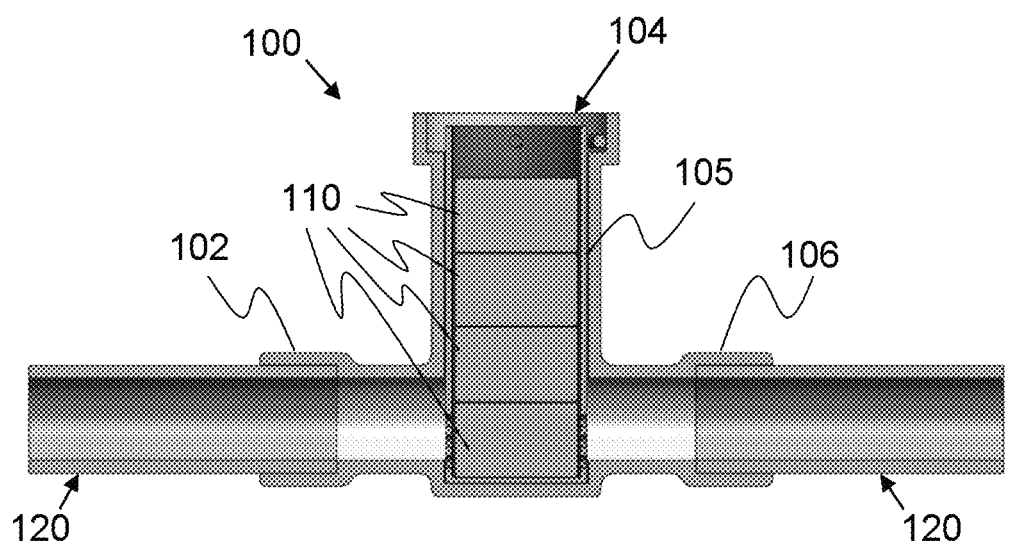
FIG. 1 is a somewhat schematic cross-sectional side view of an HVAC fluid conditioning system according to one embodiment of the present inventive concepts, including an inlet pipe connection, an outlet pipe connection, and a chlorine tablet or rod dispenser with a chlorine tablet or rod receptacle (housing chlorine tablets therein) arranged between the inlet and outlet pipe connections.
Figure 2:
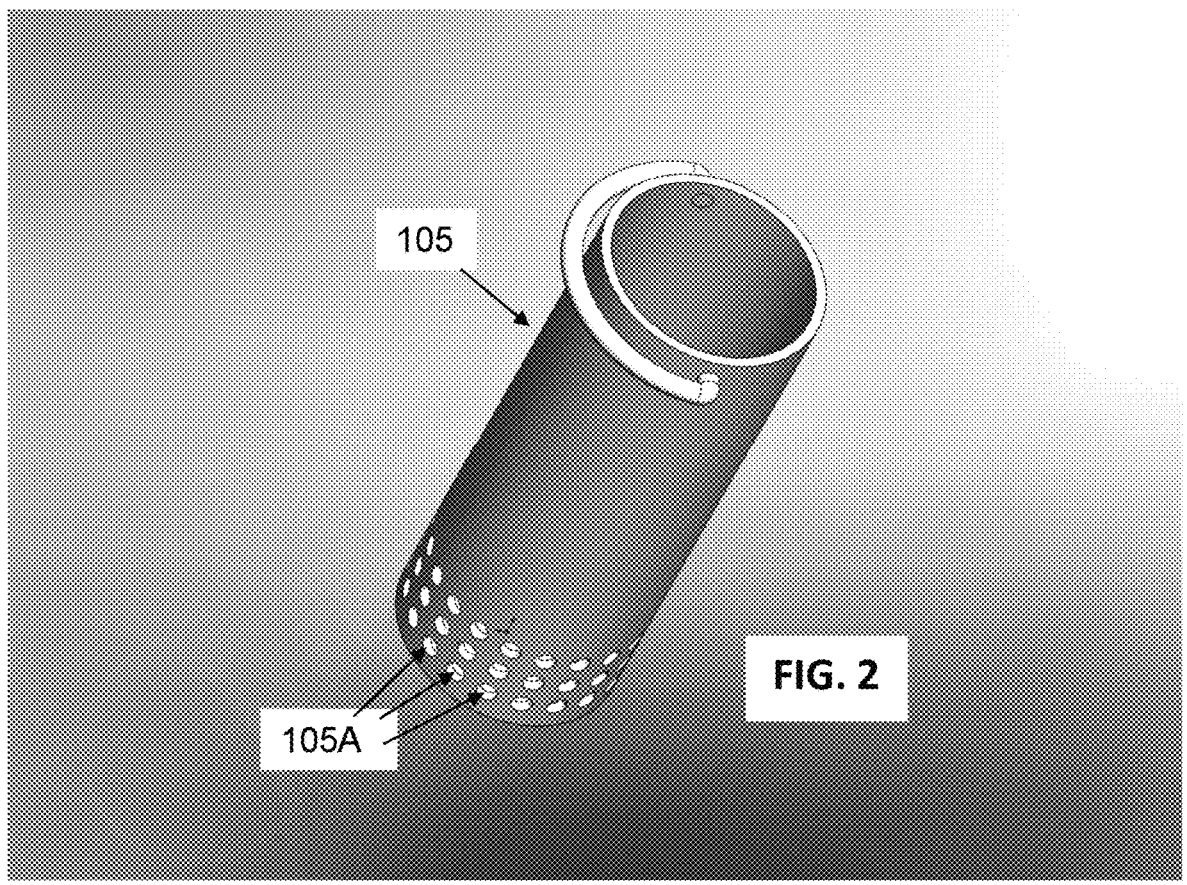
FIG. 2 is a somewhat schematic perspective view of the chlorine tablet or rod container (or receptacle) of the chlorine tablet or rod dispenser of FIG. 1.
Figure 3:
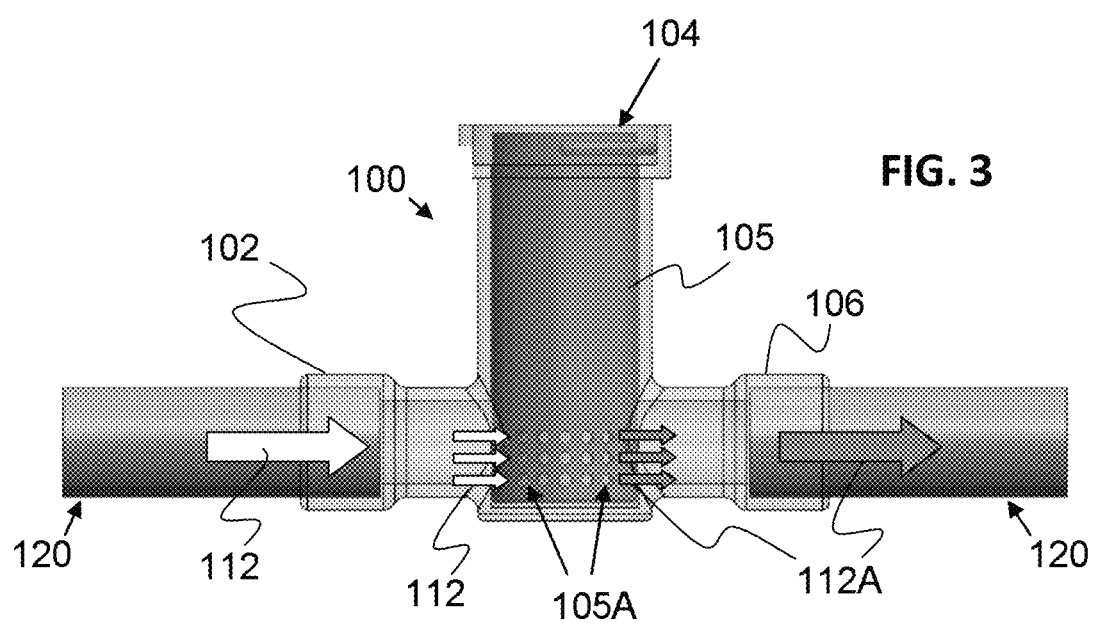
FIG. 3 is a somewhat schematic side view of the HVAC fluid conditioning system of FIG. 1, showing the conditioning system in partially transparent view and the chlorine tablet or rod receptacle in side view, and with arrows illustrating the flow of liquid through the HVAC fluid conditioning system.

FIG. 1 is a somewhat schematic cross-sectional side view of an HVAC fluid conditioning system 100 according to one embodiment of the present inventive concepts, including an inlet pipe connection 102, an outlet pipe connection 106, and a chlorine tablet dispenser 104 with a chlorine tablet (or rod) receptacle 105 housing chlorine tablets 110 (or a chlorine rod) therein. The chlorine dispenser 104 is preferably arranged between the inlet and outlet pipe connections 102, 106, respectively. FIG. 2 is a somewhat schematic perspective view of the chlorine tablet or rod container or receptacle 105 of the chlorine tablet or rod dispenser 104 of FIG. 1. And FIG. 3 is a somewhat schematic side view of the HVAC fluid conditioning system 100 of FIG. 1, showing the conditioning system 100 in transparent view and the chlorine tablet container 105 in side view. Arrows 112, 112A are further provided to illustrate the flow of liquid through the HVAC fluid conditioning system 100.

Referring to FIGS. 1 through 3, according to an embodiment of the present inventive concepts, a fluid conditioning unit 100 is installed in an HVAC unit (not shown) to dispense an appropriate amount of chlorine or other conditioning chemical into the fluid stream (represented by arrows 112) to condition the fluid 112 to kill and prevent growth of harmful pollutants.

More particularly, a fluid conditioning system 100 such as a chlorine or other chemical dispenser may be installed in an HVAC condensation line 120. The fluid conditioning system 100 may, for instance dispense a chlorine tablet 110 or other chemical tablet or rod into contact with the AC condensation water (or other conditioning fluid) 112 to eliminate algae and/or other harmful pollutants. By eliminating growth of harmful contaminants, the invention can provide a robust, reliable, and cost-effective solution for preventing clogged pipes and water back-ups due to contaminant growth in the HVAC system (not shown).

According to one embodiment, an HVAC fluid conditioning system 100 can be a chemical dispenser installed in the AC condensation line 120 of an HVAC system (not shown). Tablets 110 may be inserted into a container/receptacle 105 of the dispenser 100 and can feed into the condensation line 120. Condensation water 112 running through the condensation line 120 can pass by the tablet 110 (through holes or other openings 105A arranged in the container 105) and be conditioned with chlorine to kill and prevent the growth of algae and/or other harmful contaminants. The conditioned condensation water 112A is delivered back to the condensation line 120.

It should be noted that this system could be used in conjunction with a P or S trap plumbing system, for example, to keep chlorine fumes from entering into the structure being air conditioned. The trap system can, for instance, be installed upstream of the dispenser or be included as part of the dispenser to provide water to trap the chlorine fumes rather than permit them to enter the ambient air. Such a system will preferably prevent the HVAC system from sucking up the chlorine gas and spreading it to the structure being conditioned.

Figure 4:
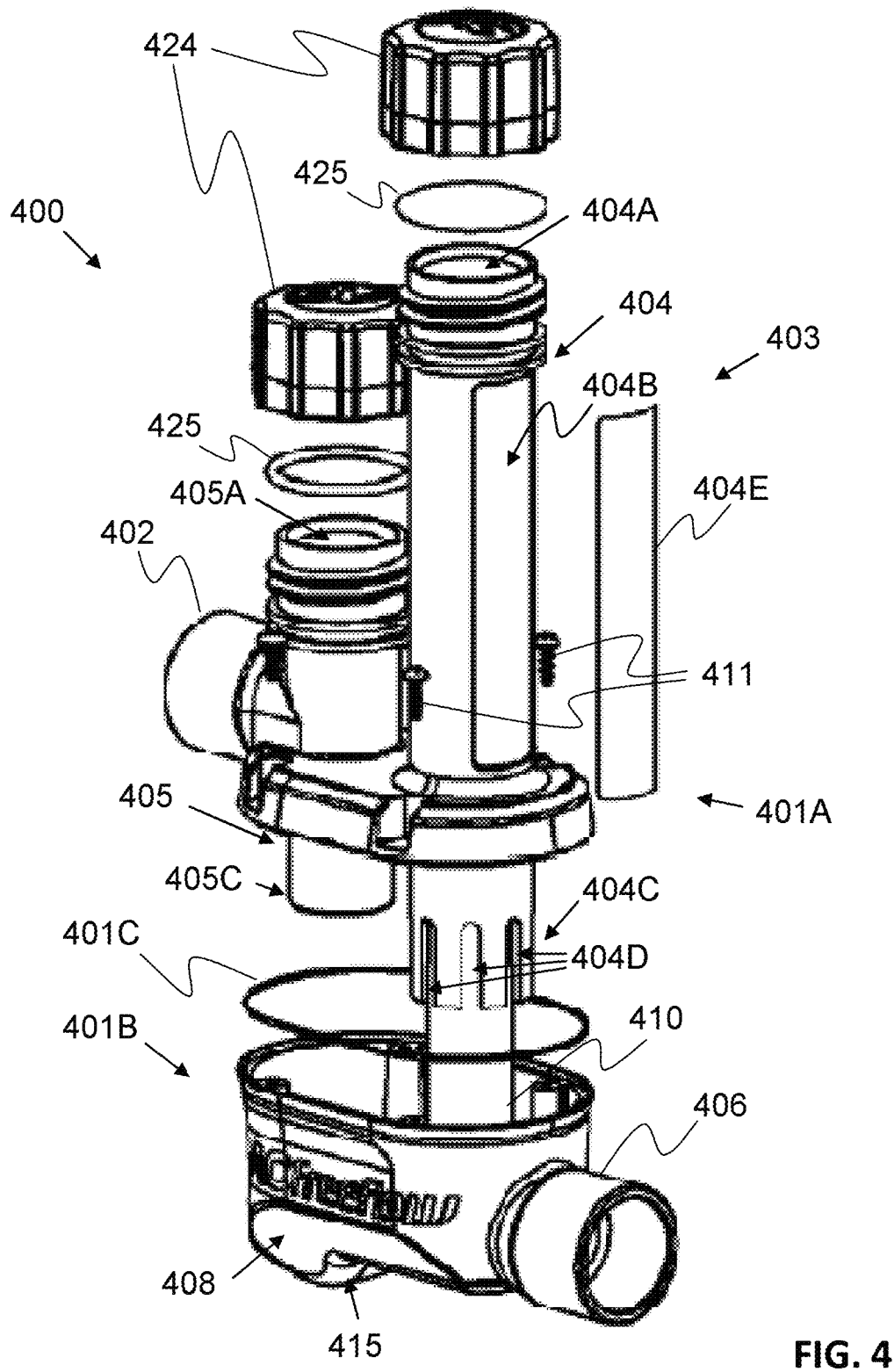
FIG. 4 is a somewhat schematic exploded perspective view of an HVAC fluid conditioning system according to another embodiment of the present inventive concepts.
Figure 5:
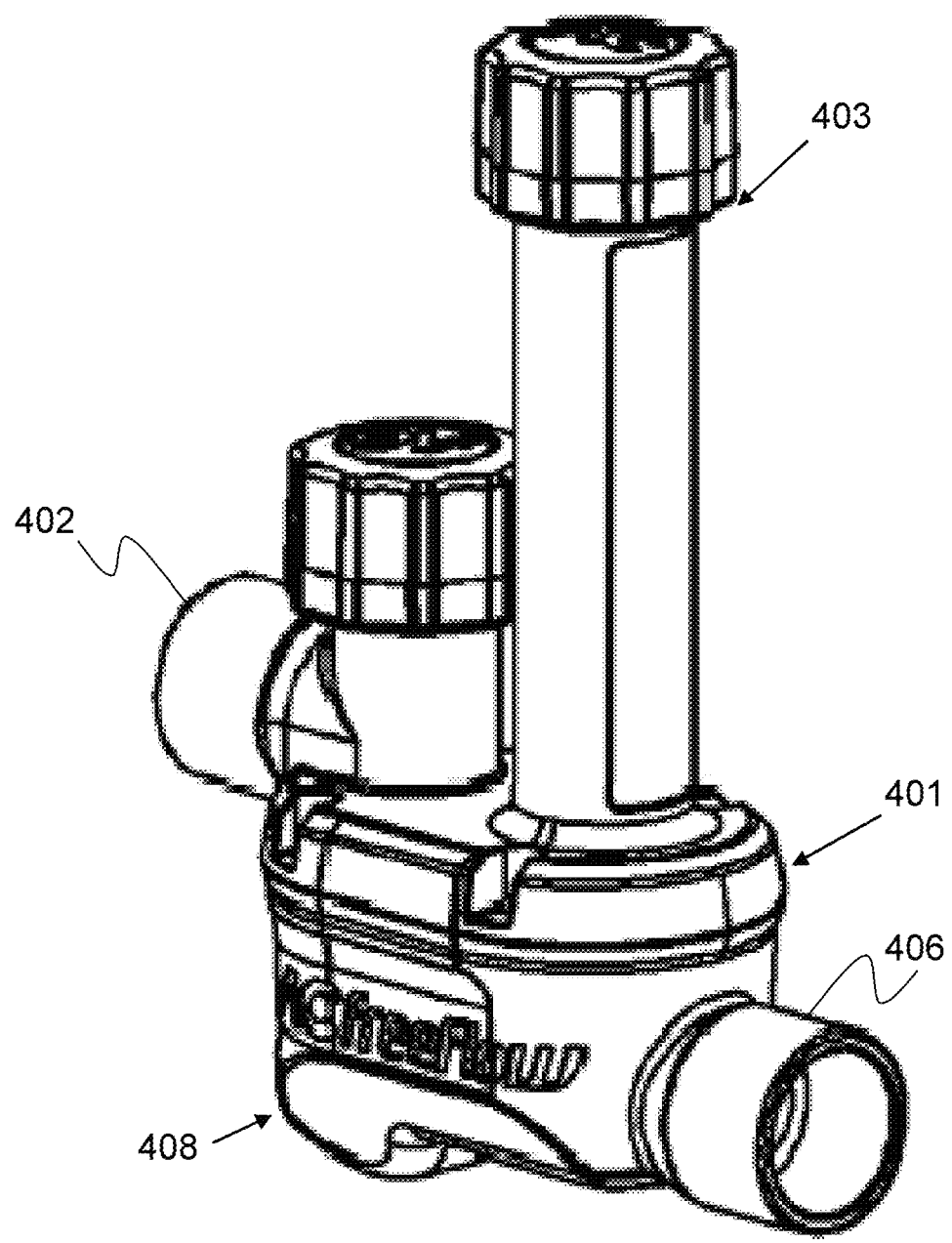
FIG. 5 is a somewhat schematic perspective view of the assembled HVAC fluid conditioning system of FIG. 4.
Figure 6:
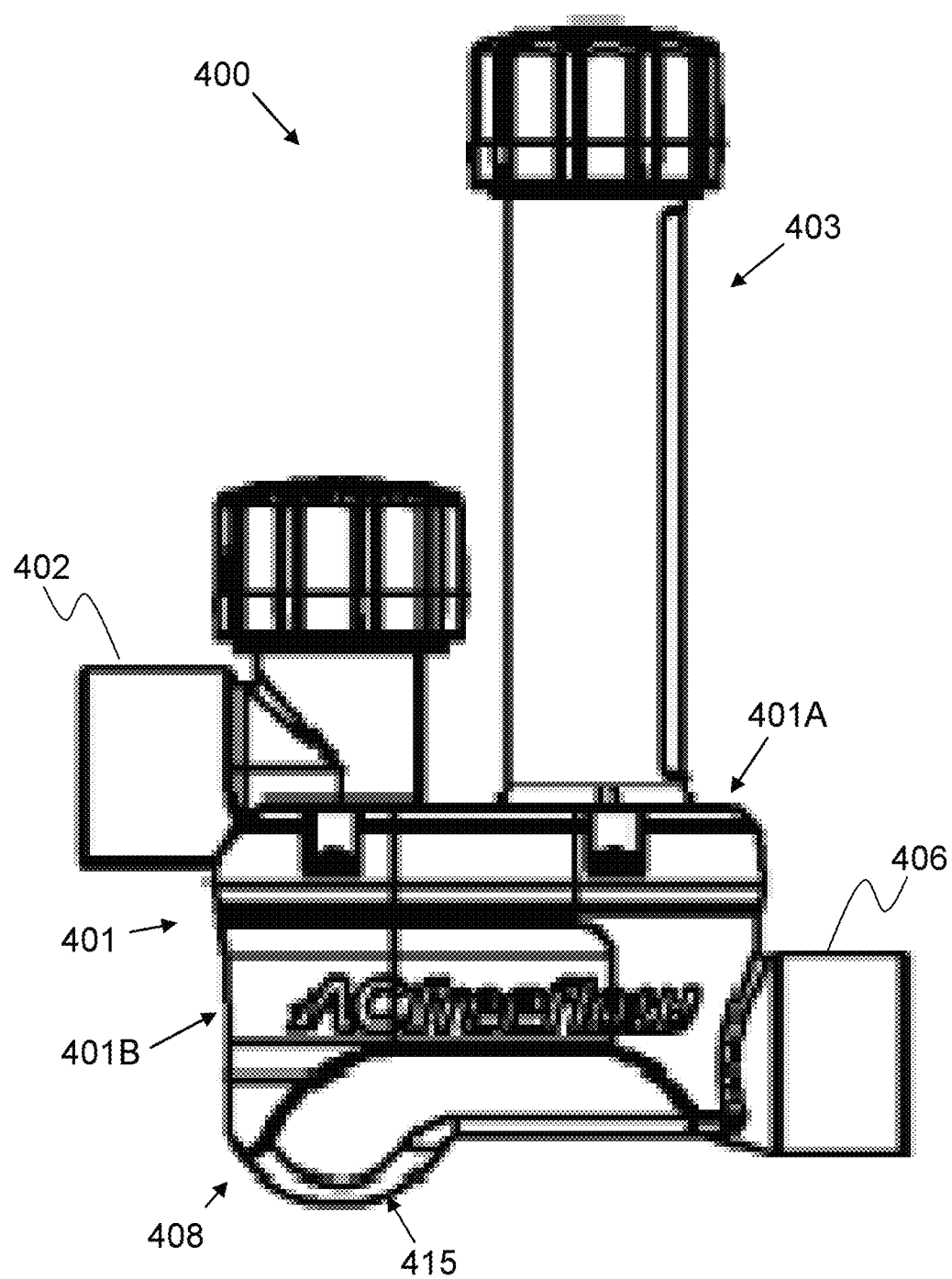
FIG. 6 is a somewhat schematic side view of the assembled HVAC fluid conditioning system of FIG. 5.
Figure 7:
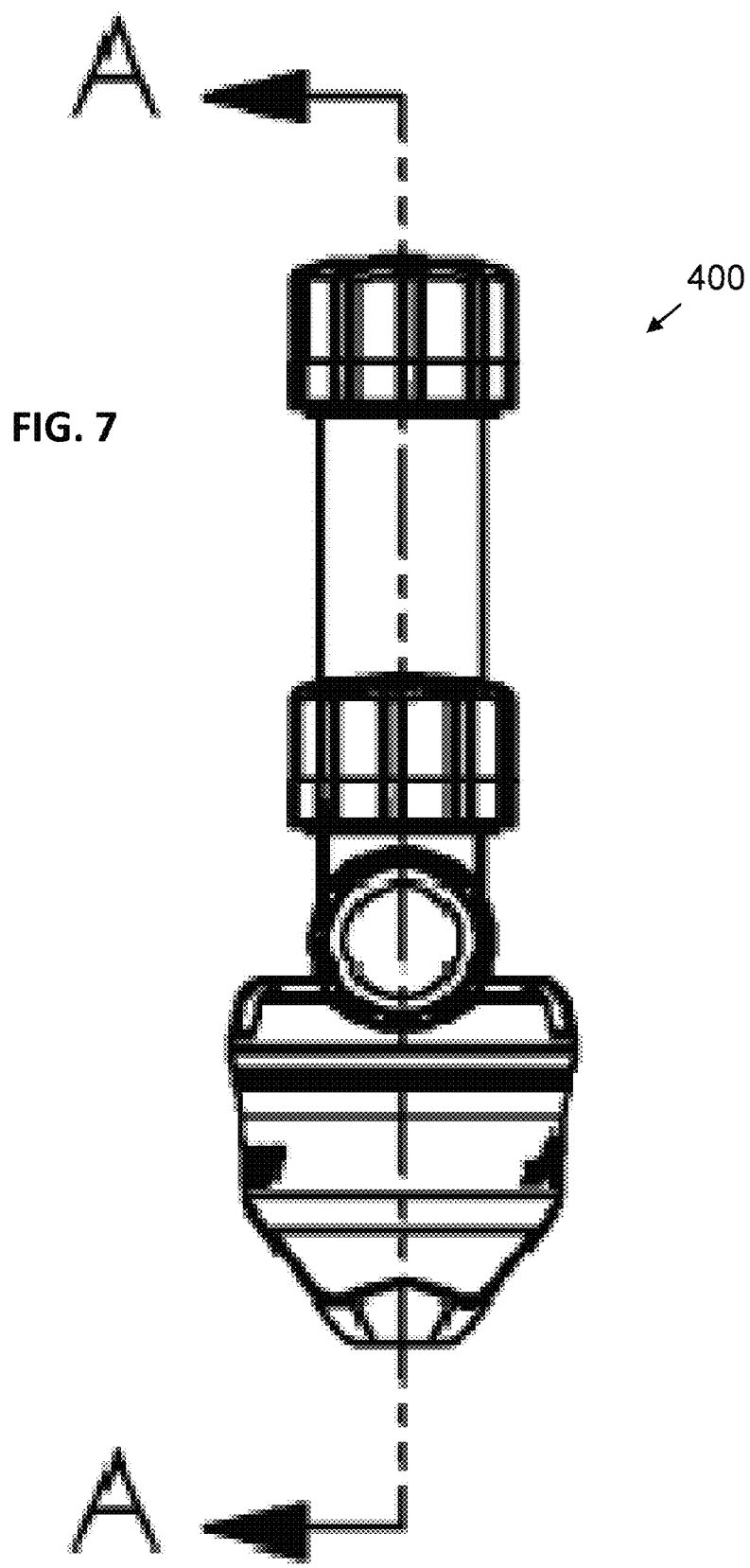
FIG. 7 is a somewhat schematic front view of the assembled HVAC fluid conditioning system of FIG. 5.
Figure 8:
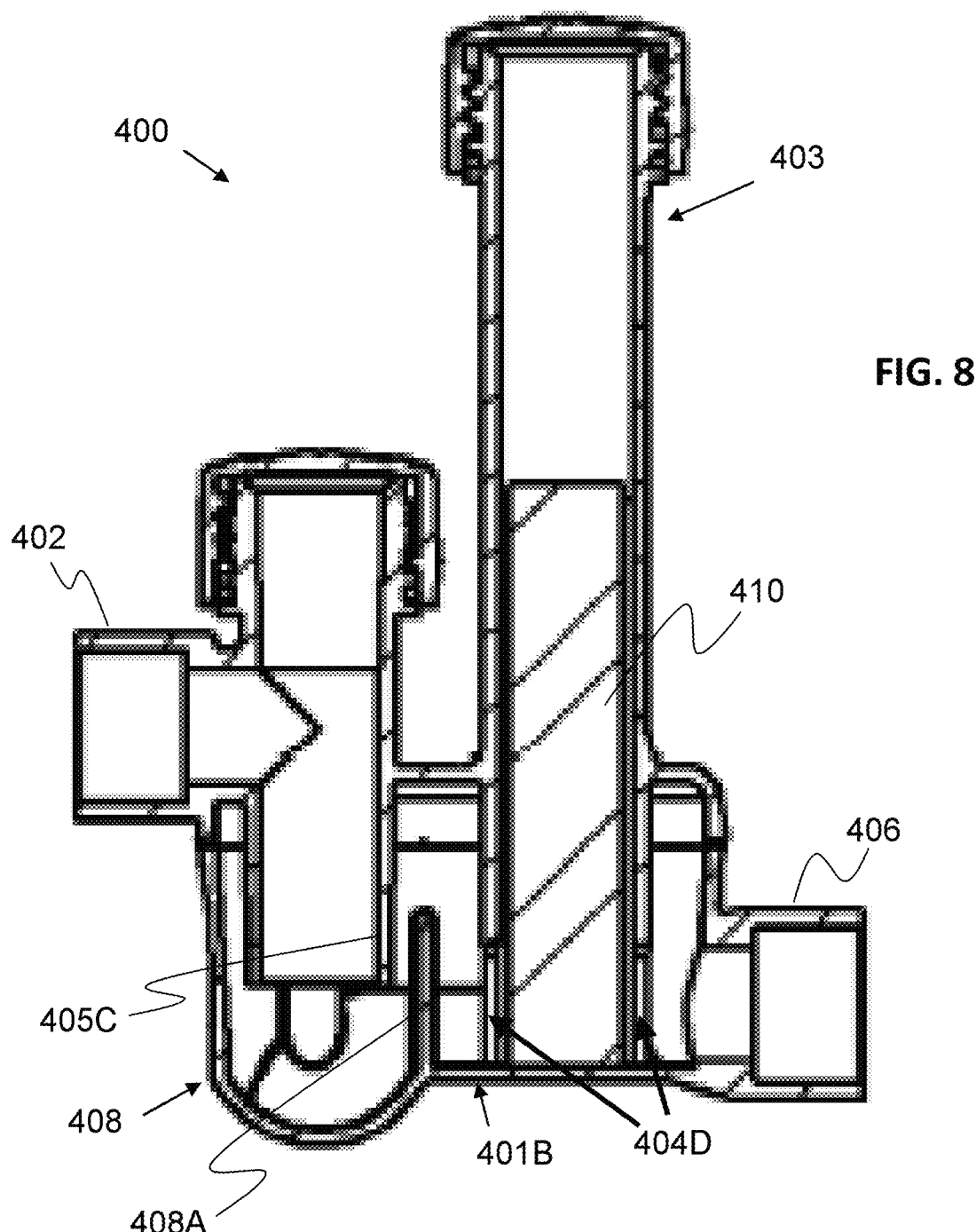
FIG. 8 is a somewhat schematic cross-sectional side view of the assembled HVAC fluid conditioning system of FIG. 5, taken along line A-A of FIG. 7.
Figure 8A:
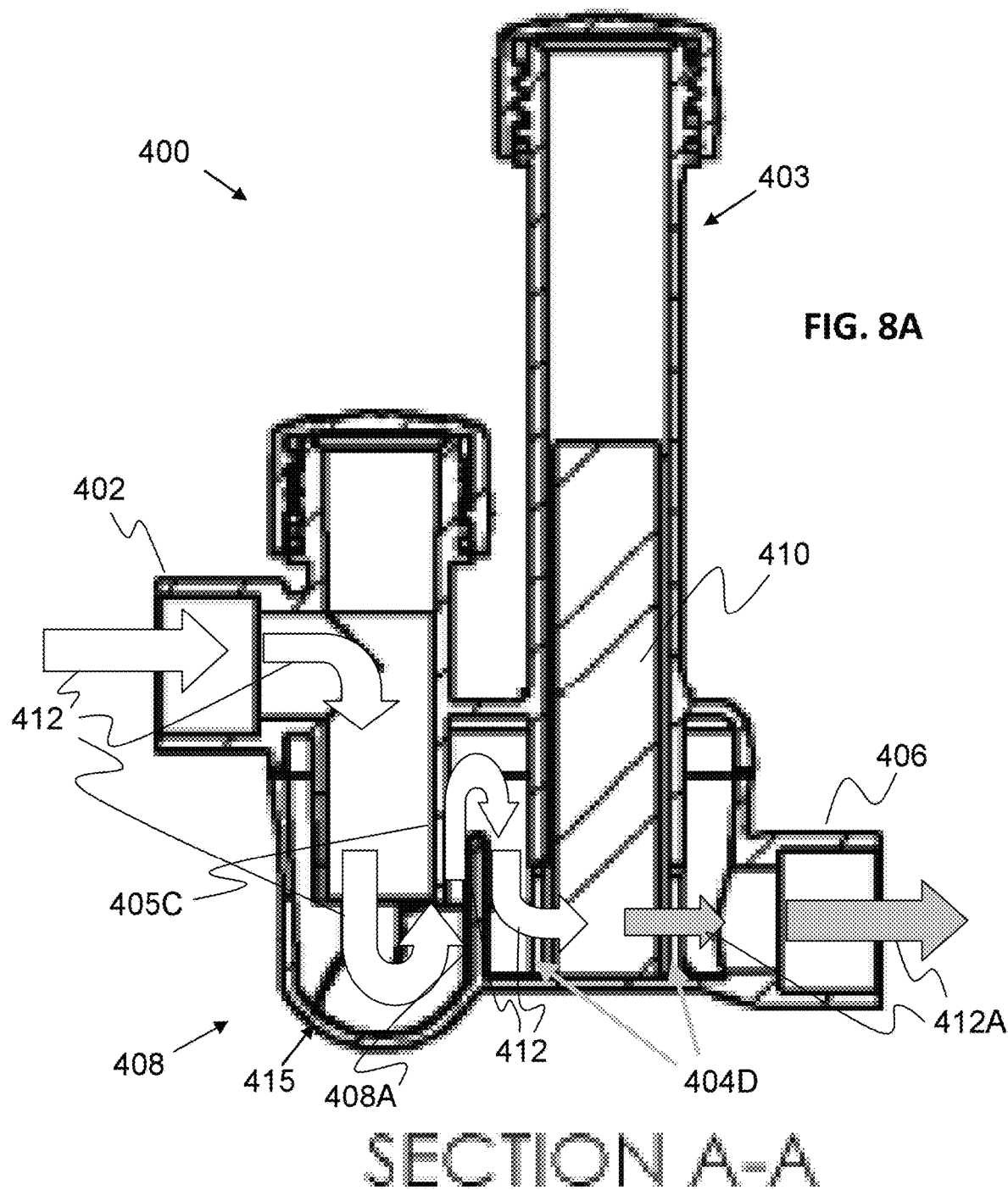
FIG. 8A is a reproduction of FIG. 8, but further includes arrows illustrating a flow of liquid through the HVAC fluid conditioning system.

Of course, alternative embodiments are also possible. FIG. 4 is a somewhat schematic exploded perspective view of an HVAC fluid conditioning system 400 according to another embodiment of the present inventive concepts. FIG. 5 is a somewhat schematic perspective view of the assembled HVAC fluid conditioning system 400 of FIG. 4. FIG. 6 is a somewhat schematic side view of the assembled HVAC fluid conditioning system 400 of FIG. 5. FIG. 7 is a somewhat schematic front view of the assembled HVAC fluid conditioning system 400 of FIG. 5. FIG. 8 is a somewhat schematic cross-sectional side view of the assembled HVAC fluid conditioning system 400 of FIG. 5, taken along line A-A of FIG. 7. And FIG. 8A is a reproduction of FIG. 8, further including arrows 412, 412A to illustrate a flow of liquid through the HVAC fluid conditioning system 400.

Referring to FIGS. 4-8A, an HVAC fluid conditioning system 400 includes an inlet pipe connector 402, an outlet pipe connector 406, and a chlorine tablet or rod dispensing unit 403. In addition, however, the HVAC conditioning system 400 also preferably provides an S or P-type trap system 408 for trapping potentially hazardous fumes within the dispenser unit 400.

The HVAC fluid conditioning system 400 can include a housing 401 formed by connecting two sections (i.e., a top section 401A and a bottom section 401B) together, using screws 411 or some other connection mechanism. A seal 401C can be included between the top and bottom sections 401A, 401B, respectively, to prevent fluid leaks. The top section 401A can, for example, provide the chlorine tablet or rod dispenser unit 403, and the bottom section 401B can provide the S or P-type trap system 408.

The chlorine tablet or rod dispenser unit 403 can include a pipe or tube 404 with an opening 404B to receive chlorine tablets or a rod 410 therein. A door or cover 404E can be provided to cover the opening 404B after the chlorine tablets or rod 410 has been inserted. The bottom end 404C of the tube 404 can include slots, holes, or other openings 404D to permit the flow of fluid 412 therethrough.

In operation, chlorine tablets or a rod 410 inserted into the opening 404B of the chlorine tablet dispenser unit 403 may drop to the bottom 404C of the tube 404. Water or other HVAC liquid 412 enters the conditioning system through the inlet connector 402. The HVAC liquid 412 passes through the trap 408 and then through the openings 404D in the bottom 404C of the tube 404 and contacts the bottom-most tablet or rod 410 in the dispenser unit 403. As the HVAC liquid passes by the rod 410 (or tablets), it dissolves the rod 410 and thereby treats the HVAC liquid 412 with chlorine. The treated HVAC fluid 412A is then delivered back to the HVAC system through the outlet pipe connector 406.

Another pipe or tube 405 can be arranged near the inlet pipe connection 402 and over the S or P-type trap 408, with a bottom wall 405C thereof forming a part of the trap system. The bottom housing section 401B can provide a rounded portion 415 configured to direct liquid flow 412 around the wall 405C and into the dispenser unit 403. The bottom housing section 401B can also comprise a wall 408A that extends away from the housing bottom 401B to form an additional part of the trap system 408. The S or P-type trap system 408 preferably traps liquid in the bottom housing section 401B to form a liquid seal that keeps unwanted gases from escaping back through the inlet pipe connector 402 and into the HVAC system (not shown).

Depending on where the conditioning system 400 is installed, it could be pressurized from a pump or have water back up, and it is therefore important to have a watertight system that prevents leakage. Threaded caps 424 and seals 425 can therefore be included on the two tubes 404 and 405 to cover and seal openings 404A, 405A in the tops of the tubes to help provide a watertight system. The removable caps 424 further provide access to the tubes 404 and 405 for maintenance and cleaning and allow de-pressurization of the system 400. The threaded cap 424 over tube 405, for example, can be removed to permit access to, and cleaning of, the P trap 408 (in this embodiment). Additional chemicals could also be added through the top opening 405A in tube 405 to clean the trap 408 if there is ever a buildup of algae or other contaminants.

As explained above, an HVAC fluid conditioning system can prevent harmful pollutants from clogging or otherwise impairing a fluid flow through an HVAC system. A trap system can further ensure that harmful gases do not escape the HVAC fluid conditioning system and enter the structure being air conditioned. Having described and illustrated principles of the present invention in various preferred embodiments thereof, it should be apparent that the invention can be modified in arrangement and detail without departing from such principles.

What is claimed is:

1. An HVAC fluid conditioning system, comprising:
a housing comprising a fluid inlet port and a fluid outlet port, wherein the fluid inlet port is arranged on a first side of the housing and can be connected to an HVAC fluid pipe to receive HVAC fluid from an HVAC system, and the fluid outlet port is arranged on an opposite side of the housing and delivers the treated HVAC fluid from the HVAC system during operation;
a conditioning unit formed as part of the housing, said conditioning unit comprising a chamber that is sized and shaped to house a chemical rod in communication with the HVAC fluid to be treated, wherein said chemical rod has a length that is greater than a width thereof;
said conditioning unit further comprising an elongated opening in a sidewall thereof that is shaped to receive the chemical rod therethrough for placement in the chamber, such that the HVAC fluid within the housing can be treated by the chemical rod located in the chamber to prevent pollutant growth; and
a trap system formed as part of the housing between the fluid inlet port and the conditioning unit to trap and prevent harmful gases from the HVAC fluid conditioning system from entering the HVAC system during operation.

2. An HVAC fluid conditioning system according to claim 1, said housing further comprising:
a top section comprising the fluid inlet port and conditioning unit formed therein; and
a bottom section that is physically separable from the top section and comprises the trap system and fluid outlet port formed therein, wherein the top section and bottom section are removably attachable to each other.

3. An HVAC fluid conditioning system according to claim 1, wherein the conditioning unit comprises a chemical rod dispenser surrounding the chamber and having a bottom structure with openings arranged between projections and wherein the chemical rod is exposed through the openings to be placed into contact with a fluid flow through the HVAC conditioning system to treat the fluid with the chemical.

4. An HVAC fluid conditioning system according to claim 3, wherein the chemical rod dispenser comprises a tube configured to receive the chemical rod through the elongated opening which is formed in a sidewall thereof.

5. An HVAC fluid conditioning system according to claim 1, wherein the housing comprises:
a top section comprising the fluid inlet port; and
a physically separate bottom section comprising the fluid outlet port, wherein the top and bottom sections are removably connected together to form the HVAC fluid conditioning system.

6. An HVAC fluid conditioning system according to claim 5, wherein the top section and bottom section are removably connected together using a plurality of screws.

7. An HVAC fluid conditioning system according to claim 5, wherein the top section comprises a first tube configured to receive fluid from the fluid inlet port and direct it toward the bottom section, wherein the bottom section comprises a curved wall configured to direct the fluid back up and between a wall of the first tube and a bottom wall protruding upward from the bottom section, wherein the top section is configured to direct the fluid back down and between the bottom wall and a wall of a second tube, and wherein the second tube includes openings in a lateral sidewall near a bottom end thereof to permit the fluid to pass through the lateral sidewall and into contact with a chemical contained therein to treat the fluid before being passed to the fluid outlet port.

8. An HVAC fluid conditioning system according to claim 7, wherein the first and second tubes each further comprise a threaded top end configured to receive a threaded cap thereon.

9. An HVAC fluid conditioning system according to claim 7, wherein the second tube comprises the elongated opening arranged in a lateral sidewall thereof that is configured to receive the chemical rod therethrough to be housed within the chamber located in the second tube.

10. An HVAC fluid conditioning system according to claim 9, wherein the second tube further comprises a door configured to cover the elongated opening in the lateral sidewall thereof.

11. An HVAC fluid conditioning system comprising:
an inlet connector configured to connect to and receive HVAC fluid from an HVAC condensation line;
a conditioning system comprising a top housing section that is removably connected to a bottom housing section, wherein the inlet connector is arranged on the top housing section; said conditioning system further comprising a receptacle that is shaped to receive a chemical rod to treat the HVAC fluid with a chemical designed to prevent the growth of harmful pollutants in the treated HVAC fluid;
wherein the conditioning system comprises a chemical rod dispenser, said chemical rod dispenser comprising the receptacle and wherein said receptacle is sized and shaped to receive and house a chemical rod therein, wherein the chemical rod has a length that is greater than its width, and wherein the chemical rod dispenser is arranged to place the chemical rod into contact with the HVAC fluid to treat the HVAC fluid with the chemical;
an elongated opening formed through a sidewall of the chemical rod dispenser, said opening configured to receive the chemical rod therethrough for placement in the receptacle;
a trap system that helps prevent pollutant gases from escaping from the HVAC fluid conditioning system into the HVAC system during operation of the conditioning system; and
an outlet connector located on the bottom housing section and arranged to deliver treated HVAC fluid from the HVAC fluid conditioning system.

12. An HVAC fluid conditioning system according to claim 11, wherein the trap system comprises a P or S-type trap system.

13. An HVAC fluid conditioning system according to claim 11, wherein the chemical rod dispenser comprises a tube that provides the receptacle.

14. An HVAC fluid conditioning system according to claim 13, further having a plurality of openings arranged through a sidewall at a bottom end of the tube to permit HVAC fluid to flow into and through the tube so that the HVAC fluid can contact and dissolve the chemical rod to treat the HVAC fluid.

15. An HVAC fluid conditioning system according to claim 14, further comprising a door or cover configured to cover the opening in the side of the tube after the chemical rod has been inserted therein.

16. An HVAC fluid conditioner comprising:
a housing comprising a separate top and bottom section that are removably connected together with screws, said housing comprising an inlet, a trap system, a conditioning system, and an outlet formed therein, wherein the inlet comprises an inlet port arranged in the top section that is configured to receive HVAC fluid from an HVAC system;

wherein the trap system comprises a P or S-type trap that is configured to prevent harmful gases from entering the HVAC system back through the inlet;

wherein the conditioning system comprises a receptacle that houses a chemical that treats the HVAC fluid to prevent the growth of harmful pollutants in the HVAC fluid during an HVAC fluid treatment process;

wherein the conditioning system further comprises an elongated opening in a sidewall thereof to receive a chemical rod therethrough, wherein the chemical rod has a length greater than a width thereof; and wherein the outlet comprises an outlet port formed in the bottom section that is configured to deliver the treated HVAC fluid from the HVAC fluid conditioner after treatment.

17. An HVAC fluid conditioner according to claim 16, further comprising a sealing ring arranged between the top section and the bottom section to prevent leaks.

18. An HVAC fluid conditioner according to claim 16, wherein the trap system comprises a P-type trap formed in the bottom of the housing to trap gasses created or released during the HVAC fluid treatment process.

19. An HVAC fluid conditioner according to claim 16, wherein the conditioning system comprises a removable door that selectively covers the elongated opening.

20. An HVAC fluid conditioner according to claim 16, wherein the conditioning system receptacle comprises openings formed through a lateral sidewall near a bottom end thereof to form a structure that permits the HVAC fluid to come into contact with the chemical rod.

\* \* \* \* \*